United States Patent
Tang et al.

(10) Patent No.: US 9,380,003 B2
(45) Date of Patent: Jun. 28, 2016

(54) XQSFP+ HOST CABLE TO UPGRADE XSFP+ BASED PRODUCTS

(71) Applicant: Cisco Technology, Inc., San Jose, CA (US)

(72) Inventors: Norman Tang, Los Altos, CA (US); Liang Ping Peng, Santa Clara, CA (US); David Lai, Mountain View, CA (US); Anthony Nguyen, San Jose, CA (US); D. Brice Achkir, San Jose, CA (US); Marco Mazzini, Milan (IT)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 14/051,959

(22) Filed: Oct. 11, 2013

(65) Prior Publication Data
US 2015/0104169 A1     Apr. 16, 2015

(51) Int. Cl.
| H04B 10/40 | (2013.01) |
| H04B 10/43 | (2013.01) |
| H04B 10/291 | (2013.01) |
| H04B 10/299 | (2013.01) |
| H04L 12/935 | (2013.01) |
| H04Q 11/00 | (2006.01) |

(52) U.S. Cl.
CPC ............ *H04L 49/30* (2013.01); *H04Q 11/0071* (2013.01)

(58) Field of Classification Search
CPC ...... H04B 10/40; H04B 10/43; H04B 10/291; H04B 10/299
USPC ............ 398/82, 135, 136, 138, 139, 175–177
See application file for complete search history.

(56) References Cited

U.S. PATENT DOCUMENTS

| 8,412,051 | B2 * | 4/2013 | El-Ahmadi et al. | 398/135 |
| 2008/0044141 | A1 * | 2/2008 | Willis et al. | 385/88 |
| 2010/0302754 | A1 * | 12/2010 | Nordin et al. | 361/810 |
| 2011/0081807 | A1 * | 4/2011 | Rephaeli et al. | 439/620.21 |
| 2012/0251116 | A1 * | 10/2012 | Li et al. | 398/79 |
| 2012/0275784 | A1 * | 11/2012 | Soto et al. | 398/38 |
| 2013/0265887 | A1 * | 10/2013 | Lavoie et al. | 370/252 |
| 2014/0248057 | A1 * | 9/2014 | Li et al. | 398/82 |
| 2014/0348468 | A1 * | 11/2014 | Lagziel et al. | 385/78 |

\* cited by examiner

*Primary Examiner* — Dalzid Singh
(74) *Attorney, Agent, or Firm* — Merchant & Gould P.C.

(57) ABSTRACT

Bandwidth translation may be provided. First, data may be transceived at a first data port. Next, the data may be transceived at a plurality of second data ports. The bandwidth of a path for the data between the first port and the plurality of second ports may be translated.

20 Claims, 4 Drawing Sheets

XQSFP+ HOST CABLE TO UPGRADE XSFP+ BASED PRODUCTS

TECHNICAL FIELD

The present disclosure relates generally to bandwidth translation.

BACKGROUND

Data transmission, digital transmission, or digital communications is the physical transfer of data (e.g., a digital bit stream) over a point-to-point or point-to-multipoint communication channel. Examples of such channels are copper wires, optical fibers, wireless communication channels, and storage media. The data are represented as an electromagnetic signal, such as an electrical voltage, radiowave, microwave, or infrared signal.

While analog transmission is the transfer of a continuously varying analog signal, digital communications is the transfer of discrete messages. The messages are either represented by a sequence of pulses by a line code (e.g., baseband transmission), or by a limited set of continuously varying wave forms (e.g., passband transmission), using a digital modulation method. The passband modulation and corresponding demodulation is carried out by modem equipment. According to the most common definition of digital signal, both baseband and passband signals representing bit-streams are considered as digital transmission.

BRIEF DESCRIPTION OF THE FIGURES

The accompanying drawings, which are incorporated in and constitute a part of this disclosure, illustrate various embodiments of the present disclosure. In the drawings.

DETAILED DESCRIPTION

Overview

Figure 1:
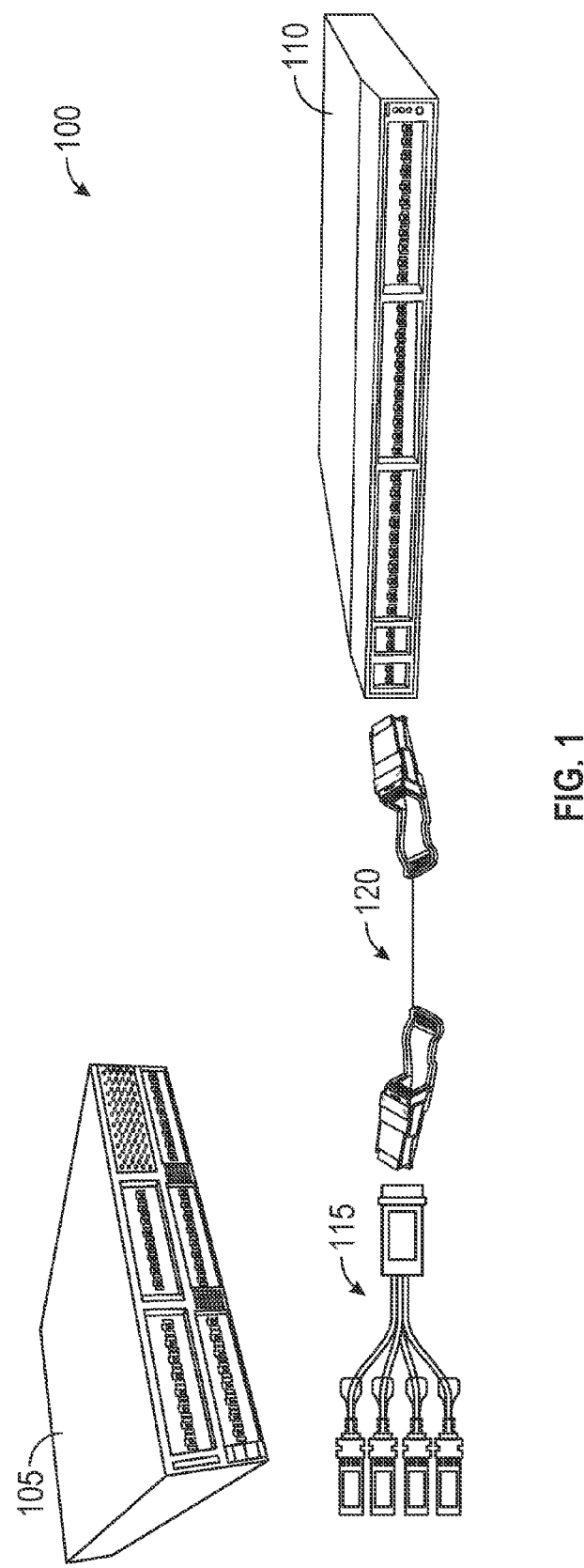
FIG. 1 is a block diagram of an operating environment for providing bandwidth translation.

Bandwidth translation may be provided. First, data may be transceived at a first data port. Next, the data may be transceived at a plurality of second data ports. The bandwidth of a path for the data between the first port and the plurality of second ports may be translated.

Both the foregoing overview and the following example embodiments are examples and explanatory only, and should not be considered to restrict the disclosure's scope, as described and claimed. Further, features and/or variations may be provided in addition to those set forth herein. For example, embodiments of the disclosure may be directed to various feature combinations and sub-combinations described in the example embodiments.

Example Embodiments

The following detailed description refers to the accompanying drawings. Wherever possible, the same reference numbers are used in the drawings and the following description to refer to the same or similar elements. While embodiments of the disclosure may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the disclosure. Instead, the proper scope of the disclosure is defined by the appended claims.

Cloud computing is used to connect a large number of computers through a real-time communication network. The emergence of cloud computing has driven the demand for datacenters and enterprise storage to house network devices. Small Form-factor Pluggable plus (SFP+) ports have been implemented to provide a connection between the network devices. This may be accomplished, for example, by implementing ten-gigabit Ethernet (10GE) port deployment. Although 10GE port deployment may be an economical solution for datacenters and enterprise infrastructure evolution, in order to increase capacity, system houses have started to transition to the Quad Small Form-factor Pluggable plus (QSFP+) platforms. QSFP+ platforms may maximize 10GE port densities, with most being used for multiplexing forty gigabit Ethernet (4×10G) traffic.

In order for users to take advantage of the QSFP+ module solutions, users may upgrade their SFP+ systems to the QSFP+ enabled systems, which requires large capital investments. Embodiments of the disclosure, however, may provide for coexistence utilizing a bandwidth translation. This bandwidth translation may allow data to be transceived from both a SFP+ port and a QSFP+ port. As will be described in greater detail below, the bandwidth of a path for the data between the SFP+ port and the QSFP+ port may be translated, allowing for coexistence.

FIG. 1 is a block diagram of an operating environment 100 for providing bandwidth translation. As shown in FIG. 1, operating environment 100 may comprise a first network device 105, a second network device 110, a bandwidth translator 115, and a link 120. The combination of bandwidth translator 115 and link 120 may provide a pathway for transmitting and receiving data between first network device 105 and second network device 110. First network device 105 may comprise any type of network device (e.g., a router, a switch, a gateway, a bridge, etc.). For example, first network device 105 may comprise a Small Form-factor Pluggable plus (SFP+) platform that supports data rates up to ten gigabits per second. Ten gigabits per second is an example and first network device 105 may comprise any platform and may support any data rate.

Second network device 110 may comprise any type of network device (e.g., a router, a switch, a gateway, a bridge, etc.). For example, second network device 110 may comprise a Quad Small Form-factor Pluggable plus (QSFP+) platform that supports data rates up to forty gigabits per second. Forty gigabits per second is an example and second network device 110 may comprise any platform and may support any data rate.

Bandwidth translator 115 is described in greater detail below with respect to FIG. 2. Fiber 120 may comprise any type of fiber cable implemented to enable communication between first network device 105 and second network device 110 via bandwidth translator 115. For example, fiber 120 may be a copper wire, a single mode, multimode, or plastic optical fiber.

Figure 2:
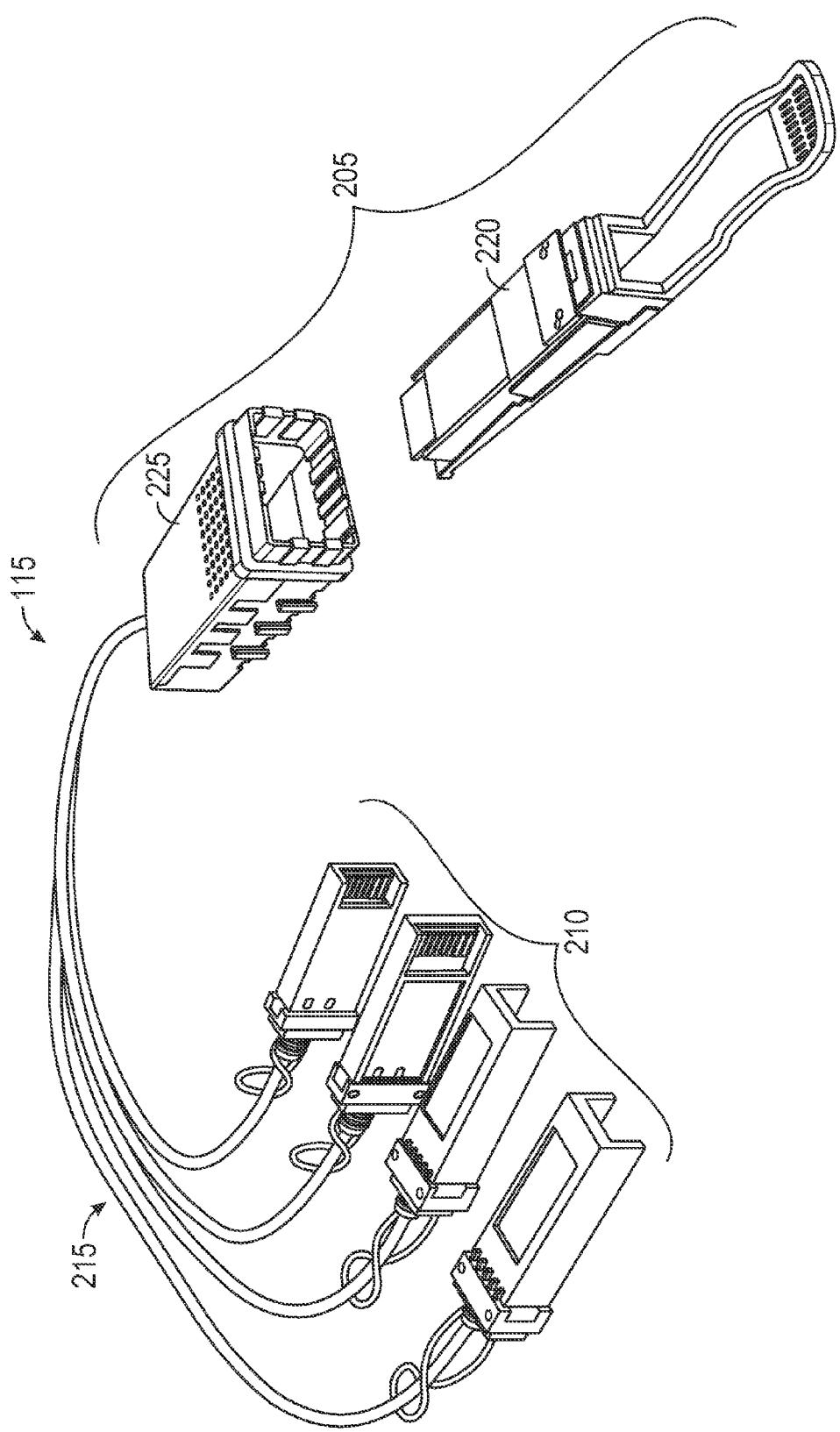
FIG. 2 is a cable assembly view of a bandwidth translator.

FIG. 2 is a cable assembly of bandwidth translator 115 in more detail consistent with embodiments of the disclosure. As shown in FIG. 2, bandwidth translator 115 may include a first port 205, a plurality of second ports 210, and a cabling 215. First port 205 may comprise a network device port for network device module connectivity. First port 205 is described in greater detail below with respect to FIG. 3.

Plurality of second ports 210 may comprise a network device to network device upgrade host cable, wherein the plurality of second ports may include more than one port. Plurality of second ports 210 is described in greater detail below with respect to FIG. 3. Cabling 215 may comprise any type of fiber cable implemented to enable communication between first port 205 and plurality of second ports 210. Cabling 215 is described in greater detail below with respect to FIG. 3. First port 205 may comprise a pluggable module 220 and a reciprocal or port 225 to facilitate, for example, connectivity during installation.

Figure 3:
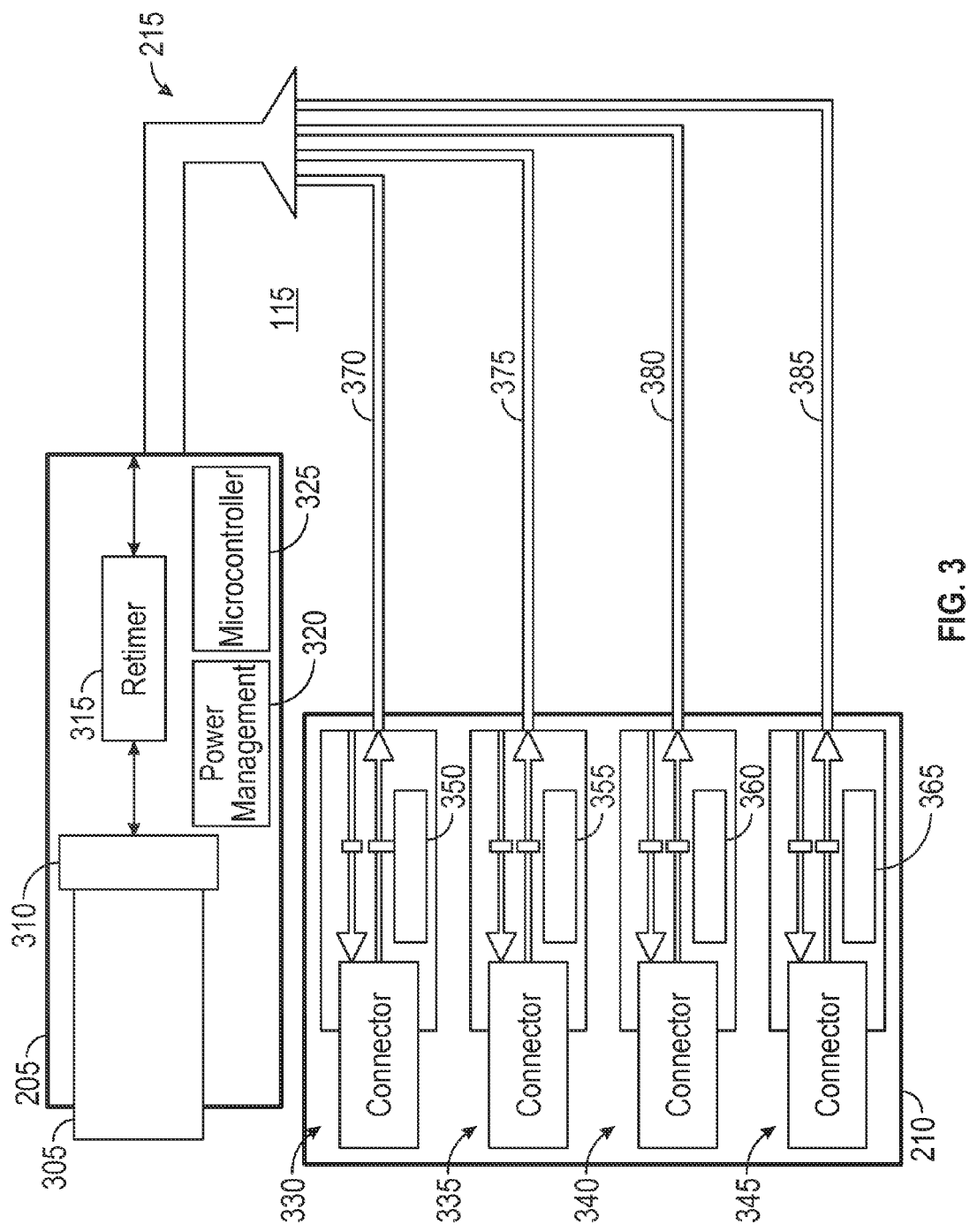
FIG. 3 is a block diagram of a bandwidth translator.

FIG. 3 is a block diagram of bandwidth translator 115 in more detail consistent with embodiments of the disclosure. As shown in FIG. 3, bandwidth translator 115 may include first port 205, plurality of second ports 210, and cabling 215. First port 205 may comprise a module 305, a module connector 310, a retimer 315, a power manager 320, and a micro controller 325. Module 305 may comprise an optical module configured to transceive optical signals from module connector 310. For example module 305 may comprise an optical module for transceiving optical signals between a QSFP+ platform and module connector 310. Module 305 may comprise an optoelectronic module configured to translate optical signals to electrical signals. For example, module 305 may comprise an optoelectronic module configured to convert electrical signals received from an SFP+ platform to optical signals readable by a QSFP+ platform. In addition, module 305 may comprise an optoelectronic module configured to convert optical signals received from a QSFP+ platform to electrical signals readable by an SFP+ platform.

Retimer 315 may comprise a module configured to restore bandwidth that has been distorted. The bandwidth distortion may occur as a result of data traveling cabling 215 and may be a function of cabling 215's length. For example, where cabling 215 comprise of a plurality of long twinaxial cables, the electrical signal received from an SFP+ platform may become distorted. Retimer 315 may be configured to restore the received distorted electrical signals. Power management 320 may comprise a power module configured to receive power from the first network device 105 and direct sufficient power to operate first port 205.

Micro controller 325 may comprise circuitry configured to translate data between module 305 and second ports 210. In other words, micro controller 325 may be configured to transceive data from second network device 110 and convert it to a readable form for a host located at first network device 105. Similarly, micro controller 325 may transceive data from a host located at first network device 105, and convert it to a readable form for second network device 110. For example, micro controller 325 may be configured to read data from a QSFP+ platform and convert it to a readable format for a host located at a SFP+ platform and vice versa.

As shown in FIG. 3, plurality of second ports 210 may comprise a first second port 330, a second second port 335, a third second port 340, and a fourth second port 345. First second port 330, second second port 335, third second port 340, and fourth second port 345 may respectively comprise a first memory 350, a second memory 355, a third memory 360, and a fourth memory 365. Each of first memory 350, second memory 355, third memory 360, and fourth memory 365 may store data describing their corresponding one of plurality of second ports 210. For example, the stored data may comprise data describing a type, a serial number, and a functionality of the corresponding one of plurality of second ports 210. The aforementioned data is an example, and first memory 350, second memory 355, third memory 360, and fourth memory 365 may store other types of data.

While embodiments of plurality of second ports 210 is described to include four second ports and four corresponding memory, modifications, adaptations, and other implementations to include more or less second ports are possible. For example, plurality of second ports 210 may comprise eight or twelve second ports, all capable of deploying ten gigabits per second. In addition, plurality of second ports 210 may be configured to transceive more or less than ten gigabits per second at each port. Consistent with embodiments of the disclosure, first port 205 may be configured to transceive more or less than forty gigabits per second; the aggregate of the bandwidth transceived from plurality of second ports 210.

As shown in FIG. 3, cabling 215 may include a plurality of cables comprising, for example, a first cable 370, a second cable 375, a third cable 380, and a fourth cable 385. While cabling 215 is shown to include four cables, embodiments of the disclosure may include any number of cables. The plurality of cables may vary corresponding with the number of plurality of second ports 210. Cabling 215 may comprise any type of cable implemented to enable communication between first port 205 and plurality of second ports 210. For example, cabling 215 may be a twinaxial cable, a copper wire, a single mode, multimode or plastic optical fiber.

Micro controller 325 may comprise circuitry configured to translate data between module 305 and plurality of second ports 210. For example, module 305 may operate at a first bandwidth (e.g., forty gigabits per second) and each of plurality of second ports 210 (e.g., first second port 330, second second port 335, third second port 340, and fourth second port 345) may operate at a second bandwidth (e.g., ten gigabits per second). The first bandwidth may be equal to the number of second ports multiplied by the second bandwidth. Micro controller 325 may combine and map the data received from plurality of second ports 210 into a format capable of being transmitted out of module 305 (e.g., SFP+ to QSFP+). Likewise, micro controller 325 may separate and map the data received from module 305 into a format capable of being transmitted out of and substantially equally among plurality of second ports 210 (e.g., QSFP+ to SFP+). Consequently, micro controller 325 may translate bandwidth of a path in bandwidth translator 115 for data between first port 305 and plurality of second ports 210.

Figure 4:
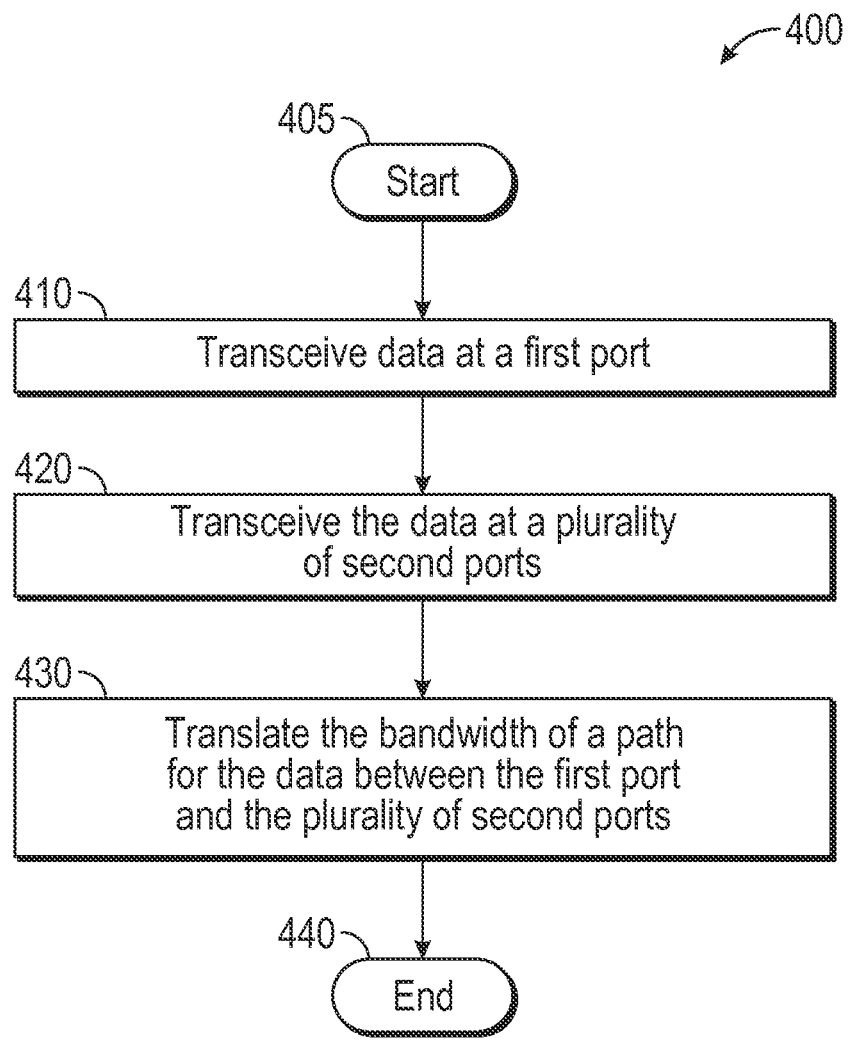
FIG. 4 is a flow chart of a method for providing bandwidth translation.

FIG. 4 is a flow chart setting forth the general stages involved in a method 400 consistent with an embodiment of the disclosure for providing bandwidth translation. Method 400 may be implemented using micro controller 325 as described in more detail above with respect to FIG. 3. Ways to implement the stages of method 400 will be described in greater detail below.

Method 400 may begin at starting block 405 and proceed to stage 410 where first port 205 in system 100 may transceive data. For example, first port 205 may be connected to a QSFP+ platform (e.g., second network device 110) configured to deploy data at forty gigabits per second. Conversely, first port 205 may be connected to a QSFP+ platform configured to receive data at forty gigabits per second from plurality of second ports 210. In addition, first port 205 may be configured to transceive more or less than forty gigabits per second; the aggregate of the bandwidth received or deployed from plurality of second ports 210.

From stage 410, where first port 205 in system 100 transceives the data, method 400 may advance to stage 420 where plurality of second ports 210 may transceive the data. For example, plurality of second ports 210 may be connected to a SFP+ platform (e.g., first network device 105) configured to deploy data at ten gigabits per second at each port. Conversely, plurality of second ports 210 may be connected to a SFP+ platform configured to receive data at forty gigabits per second from first port 205. In addition, plurality of second ports 210 may be configured to aggregately transceive more or less than forty gigabits per second; the bandwidth capacity of first port 205. While embodiments of plurality of second ports 210 is described to include four second ports, embodiments of the disclosure may include any number.

While the data is being transceived at first data port 205 and plurality of second data ports 210 in stages 410 and 420 respectively, method 400 may continue to stage 430 where bandwidth of a path for the data between first port 205 and plurality of second ports 210 may be translated by micro controller 325. For example, module 305 may operate at a first bandwidth (e.g., forty gigabits per second) and each of plurality of second ports 210 (e.g., first second port 330, second second port 335, third second port 340, and fourth second port 345) may operate at a second bandwidth (e.g., ten gigabits per second). The first bandwidth may be equal to the number of second ports multiplied by the second bandwidth. Micro controller 325 translates the module 305 management interface format to that of the second port 210.

Furthermore, plurality of second ports 210 may be configured to transceive electrical signals from a SFP+ platform. The transceived electrical signals may be distorted by traveling cabling 215. The transceived electrical signals may be restored as described in more detail above with respect to FIG. 3. These electrical signals may be translated into optical signals via module 305 readable by a QSFP+ platform located at first port 205. Once the bandwidth is translated in stage 430, method 400 may then end at stage 440.

Embodiments of the disclosure, for example, may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process. Accordingly, the present disclosure may be embodied in hardware and/or in software (including firmware, resident software, micro-code, etc.). In other words, embodiments of the present disclosure may take the form of a computer program product on a computer-usable or computer-readable storage medium having computer-usable or computer-readable program code embodied in the medium for use by or in connection with an instruction execution system. A computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. More specific computer-readable medium examples (a non-exhaustive list), the computer-readable medium may include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

While certain embodiments of the disclosure have been described, other embodiments may exist. Furthermore, although embodiments of the present disclosure have been described as being associated with data stored in memory and other storage mediums, data can also be stored on or read from other types of computer-readable media, such as secondary storage devices, like hard disks, floppy disks, or a CD-ROM, a carrier wave from the Internet, or other forms of RAM or ROM. Moreover, the semantic data consistent with embodiments of the disclosure may be analyzed without being stored. In this case, in-line data mining techniques may be used as data traffic passes through, for example, a caching server or network router. Further, the disclosed methods' stages may be modified in any manner, including by reordering stages and/or inserting or deleting stages, without departing from the disclosure.

Furthermore, embodiments of the disclosure may be practiced in an electrical circuit comprising discrete electronic elements, packaged or integrated electronic chips containing logic gates, a circuit utilizing a microprocessor, or on a single chip containing electronic elements or microprocessors. Embodiments of the disclosure may also be practiced using other technologies capable of performing logical operations such as, for example, AND, OR, and NOT, including but not limited to mechanical, optical, fluidic, and quantum technologies. In addition, embodiments of the disclosure may be practiced within a general purpose computer or in any other circuits or systems.

Embodiments of the disclosure may be practiced via a system-on-a-chip (SOC) where each or many of the components illustrated in FIG. 2 may be integrated onto a single integrated circuit. Such an SOC device may include one or more processing units, graphics units, communications units, system virtualization units and various application functionality all of which may be integrated (or "burned") onto the chip substrate as a single integrated circuit. When operating via an SOC, the functionality described herein with respect to embodiments of the disclosure, may be performed via application-specific logic integrated with other components of computing device 400 on the single integrated circuit (chip).

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

What is claimed is:

1. A method comprising:
   transceiving data at a first port, wherein the first port comprises a receptacle configured to house a module, a module connector, a retimer, a power manager, and a micro controller, the first port comprising a QSFP+port configured to operate at forty gigabits per second;

transceiving the data at a plurality of second ports, each of the plurality of second ports comprising a SFP+ port configured to operate at ten gigabits per second, the plurality of second ports comprising a respective plurality of plugs being connected to the receptacle by a respective plurality of corresponding cables; and translating, by the micro controller, the management interface format between the first port and the plurality of second ports.

2. The method of claim 1, wherein transceiving data at the first port comprises transceiving the data from a QSFP+ platform.

3. The method of claim 1, wherein translating the bandwidth comprises restoring a distorted electrical signal received from the plurality of second ports.

4. The method of claim 3, wherein translating the bandwidth further comprises configuring the micro controller to control the retimer.

5. The method of claim 3, wherein translating the bandwidth further comprises translating the restored electrical signal to an optical signal.

6. The method of claim 5, wherein translating the bandwidth further comprises transceiving the electrical signal from the module connector.

7. The method of claim 1, wherein translating the bandwidth comprises transceiving the data from the first port and converting it to a readable form for a host comprising the plurality of second ports.

8. The method of claim 1, wherein transceiving the data at the plurality of second ports comprises transceiving data compatible for a SFP+ platform.

9. An apparatus comprising:
a first port configured to transceive data, the first port comprising a receptacle;
a plurality of second ports configured to transceive the data, the plurality of second ports respectively comprising a plurality of plugs respectively connected to the receptacle via a respective plurality of corresponding cables;
a micro controller, disposed within the receptacle, configured to translate bandwidth of a path for the data between the first port and the plurality of second ports; and
a retimer, disposed within the receptacle, configured to restore a distorted signal received from the plurality of second ports wherein the micro controller is configured to control the retimer.

10. The apparatus of claim 9, wherein the first port comprises a connection compatible with a QSFP+ platform.

11. The apparatus of claim 9, further comprising a module configured to translate the restored signal to an optical signal.

12. The apparatus of claim 11, further comprising a module configured to transceive the optical signal from the mixer.

13. The apparatus of claim 9, wherein each of the plurality of second ports comprise a connection compatible with a SFP+ platform.

14. A method comprising:
transceiving data at a first port, wherein the first port comprises a receptacle configured to house a module, a module connector, a retimer, a power manager, and a micro controller;
transceiving the data at a plurality of second ports, the plurality of second ports comprising a respective plurality of plugs being connected to the receptacle by a respective plurality of corresponding cables; and
translating, by the micro controller, the management interface format between the first port and the plurality of second ports.

15. The method of claim 14, wherein translating the bandwidth comprises restoring a distorted electrical signal received from the plurality of second ports.

16. The method of claim 15, wherein translating the bandwidth further comprises translating the restored electrical signal to an optical signal.

17. The method of claim 16, wherein translating the bandwidth further comprises transceiving the electrical signal from the module connector.

18. The method of claim 14, wherein translating the bandwidth comprises transceiving the data from the first port and converting it to a readable form for a host comprising the plurality of second ports.

19. The method of claim 14, wherein transceiving the data at the first port comprises transceiving the data at the first port wherein the first port comprises a QSFP+ port configured to operate at forty gigabits per second.

20. The method of claim 14, wherein transceiving the data at the plurality of second ports comprises transceiving the data at the plurality of second ports wherein each of the plurality of second ports comprises a SFP+ port configured to operate at ten gigabits per second.

* * * * *